United States Patent [19]

Stringer et al.

[11] 4,123,288

[45] Oct. 31, 1978

[54] CALCINATION

[75] Inventors: James A. Stringer, Barnstone; David Watson, Waltham on the Wolds, Nr. Melton Mowbray, both of England

[73] Assignee: The Associated Portland Cement Manufacturers Limited, England

[21] Appl. No.: 735,541

[22] Filed: Oct. 26, 1976

[30] Foreign Application Priority Data

Oct. 30, 1975 [GB] United Kingdom ............... 44954/75
Jan. 13, 1976 [GB] United Kingdom ............... 01177/76

[51] Int. Cl.$^2$ ............................................... C04B 7/02
[52] U.S. Cl. ..................................... 106/100; 106/103
[58] Field of Search ................................ 106/100, 103

[56] References Cited

U.S. PATENT DOCUMENTS 3,235,239  2/1966  Petersen ............................ 106/100

Primary Examiner—J. Poer

[57] ABSTRACT

The invention relates to a method of thermal calcination of minerals wherein mineral matter is calcined in a calcination system comprising an optional pretreatment zone and a kiln directly fired by a fuel which must exceed a predetermined calorific value but must not exceed a predetermined ash content, and wherein combustible matter which need not satisfy said calorific value and ash content requirements is burned in separate combustion apparatus external to the calcination system and heat transferred from said separate combustion apparatus to the calcination system in at least one gaseous medium is employed to replace part of said fuel.

15 Claims, 4 Drawing Figures

CALCINATION

Thermal calcination of minerals is a common manufacturing process. Many such processes, particularly those where endothermic reactions or evaporation of moisture are also required, entail a substantial fuel consumption and often the fuel cost is a major element in the total operational costs. There is, therefore, an incentive (1) to reduce heat consumption, or (2) to develop techniques to enable all or the majority of the required thermal energy to be generated by the combustion of low grade fuels which would be unsuitable for other purposes or which might indeed be regarded as useless waste products, such low grade fuels for these reasons having a low price in comparison with the more usual high grade fuels.

The present invention concerns the latter case (2) and relates to a novel method of utilizing low grade fuels.

A typical example of a thermal calcination process requiring the provision of heat for endothermic reactions and often also for the evaporation of water, is the manufacture of Portland cement clinker. The raw materials comprise mainly two constituents: calcareous material (usually limestone or chalk) and argillaceous or siliceous material (usually clay or shale and often, in part, the ash from coal or other solid fuel). There is an incentive to use coal, in particular high ash coals or coal-mine or coal washery discards, because Portland cement clinker manufacture is one of the few processes where the fuel ash may become usefully incorporated into the end product, the fuel ash becoming in effect one of the raw materials of manufacture. The solid fuel must, however, be so used that the ash may become homogeneously blended into and chemically reacted with the other raw materials of manufacture.

There are two main types of manufacturing process for Portland cement clinker. In the wet process the calcareous and argillaceous raw materials are finely ground and blended together in the required proportions together with water to make a slurry typically of between 30 and 40 percent by weight moisture content (wet basis). This slurry is then fed to a rotary kiln, which is fired with solid or liquid or gaseous hydrocarbon fuel, and in which the necessary processes of water evaporation, decarbonation of the calcium carbonate, and reaction of the calcium oxide with silica and other metal oxides are effected. The fuel consumption of this wet process of manufacture depends very much on the moisture content of the kiln feed slurry and typically lies between 1350 and 1750 kcal per kg of cement clinker product.

In the dry processes of Portland cement clinker manufacture, the calcareous and argillaceous raw materials are dried and finely ground together, the necessary proportioning and blending together of the constituents usually being done partly before and partly after the drying and grinding stage, to make a dry, fine powder which is the feed material for the calcination process. This powder feed is then introduced into the rotary kiln, often by way of a series of cyclone heat exchangers, where the necessary processes of decarbonation and reaction are effected. The fuel consumption of the dry processes may vary from 700 to 1100 kcal per kg of cement clinker product, depending mainly on the number and the efficiency of the cyclone heat exchangers which precede the rotary kiln.

It will be obvious that, on grounds of fuel consumption and fuel cost per tonne product, the dry processes are much to be preferred to the wet processes of manufacture. There are however many cases where the wet process is used, for various reasons, e.g., where the raw materials as quarried have a high moisture content, for reasons connected with the detailed chemical composition of the raw materials, or where the raw material quarries necessarily lie a considerable distance from the desired location of the main clinker making plant and there is a considerable financial benefit in conveying the raw material as a slurry because that is an inexpensive method of transport. Also, an existing wet process calcination plant may represent a considerable financial investment which the operator cannot afford to discard and replace with dry process plant.

For these situations it is desirable to find a low grade, low price fuel and to use that fuel for such stages in the calcination process to which it can practicably be applied, particularly for the low grade heating stages of slurry water evaporation and preheating and even partly decarbonating the cement kiln feed material, so that the use of high grade, relatively expensive fuel is confined to that highest temperature part of the process for which its use is essential. Typical waste or low grade fuels include colliery minestone, domestic or industrial refuse, waste oils, oil shale, or toxic chemicals. Also, since the available low grade, relatively inexpensive fuels will often have a high ash content, it is in such cases necessary to ensure that the ash resulting from the fuel is intimately blended with the calcareous and other argillaceous constituents of the feed raw materials. If a cement kiln is fired directly with a very high ash fuel the fuel ash tends to fall out in the kiln onto the material being processed in such a way that it is not homogeneously incorporated and hence the cement clinker product itself becomes inhomogeneous and its quality consequently is reduced. The overall fuel consumption, in kcal per kg of clinker product, is reduced by use of a high ash fuel in the wet process of manufacture if the ash can be properly assimilated in the clinker, because the incorporation of the fuel ash reduces the proportion of argillaceous raw material required in the kiln feed slurry and thereby the input of slurry moisture to the kiln is reduced relative to the output of clinker product. Also, the moisture content required in the kiln feed slurry to make it pumpable is often dependent primarily on the proportion of argillaceous raw material in the kiln feed and by reducing the proportion of argillaceous raw material the moisture content of slurry can be reduced.

A special case is in the manufacture of white Portland cement clinker where, in order to maintain product colour, it is necessary to fire the kiln with a relatively expensive low ash fuel, typically fuel oil, and to quench the clinker with water rather than use a conventional air cooler. Since such an air cooler acts as a heat recuperator, recovering the clinker sensible heat in the cooling air which then acts as preheated combustion air for the kiln, the omission of an air cooler means that further high grade fuel must be added to the kiln to compensate for the lack of air preheat. In addition, to obtain the same gas temperature, yet further high grade fuel must be supplied because of the larger quantity of gas to be heated to this temperature.

According to the present invention we provide a method of thermal calcination of minerals wherein mineral matter is calcined in a calcination system comprising an optional pretreatment zone and a kiln directly fired by a fuel which must exceed a predetermined calorific value but must not exceed a predetermined ash content, and wherein combustible matter which need not satisfy said calorific value and ash content requirements is burned in separate combustion apparatus external to the calcination system and heat transferred from said separate combustion apparatus to the calcination system in at least one gaseous medium is employed to replace part of said fuel.

We refer herein to fuels which satisfy said calorific value and ash content requirements as high grade fuel, and to all other combustible matter as low grade fuel.

This invention thus concerns methods of burning low grade or waste fuels in combustion apparatus external to the calcination system and using the heat from such low grade or waste fuels in the calcination system by using the hot gases from the combustion apparatus directly in the calcination system or indirectly, by using them to preheat further gases in a heat exchanger. Such separate combustion apparatus can advantageously be designed to accommodate specific combustion requirements for the particular low grade or waste fuel used; in particular, it may be a fluidised bed combustor for burning of high ash coals and colliery discards or other waste or low quality solid and liquid hydrocarbons, or a grate incinerator for burning domestic or industrial refuse, for example. If required, some degree of gas decontamination, such as the removal of part of the dust, may be used between the combustion apparatus and the calcination system.

The temperature of the bed of a fluidised bed combustor and hence of the hot combustion products from it must not be allowed to exceed the melting or "stickiness" temperature of the ash retained in the bed. In the case of most solid or coal fuels this limits the temperature of the hot combustion products to a maximum of about 900° C. Typically a grate incinerator burning domestic refuse will also operate with a gas exit temperature of about 900° C. This means that the useful application of the hot gases to a mineral calcination process is limited to that part of the process which is effected at a temperature of about 900° C. or below. In the cement making process, however, particularly the wet process, and also in some other calcination processes, the majority of the thermal requirement is for water evaporation and for endothermic decarbonation, both of which can be effected at temperature of about 900° C. or below.

According to one aspect of the present invention we provide a process of calcination, which involves a preliminary heat treatment of the said materials in the wet or dry state at a temperature not exceeding about 900° C. and wherein the heat required for the preliminary heat treatment is at least in part obtained by the combustion of solid particulate or liquid fuel, preferably comprising low grade fuel, in a fluidised bed or grate combustor external to the calcination system.

In a fluid bed combustor burning high ash coal or colliery discards, a considerable proportion of the solid fuel ash may be elutriated from the combustor bed and entrained in the hot combustion products. For many processes this suspended ash in the hot combustion products would be unacceptable and would have to be removed and at such high temperatures the application of high efficiency gas cleaning methods would be difficult and expensive. In the method of application contemplated here, however, the ash suspended in the hot gas is homogeneously incorporated into the main raw material feed to the calcination process and thereby makes a positive contribution to the overall fuel consumption and economics of the process.

Often the elutriated ash from the fluid bed combustor, when burning a solid fuel, contains an appreciable amount of unburned carbon; the methods of application considered here allow this unburned carbon to be burned out and the combustion heat thereby released to be usefully employed in the calcination process.

Similarly a grate incinerator emits dusty and/or otherwise polluted gases which in a conventional incinerator arrangement have to be cleaned and cooled before discharge to atmosphere. In a conventional incinerator system the gas cleaning equipment contributes a large proportion of the total cost. In embodiments of the present invention all the gases from such an incinerator pass through part of the cement manufacture calcination system and are scrubbed and cleaned by the cement raw materials and the cement plant gas cleaning equipment, and pass to atmosphere by way of the cement plant effluent stack, hence requiring no separate gas cleaning equipment.

In another embodiment of the present invention an external combustor is used to preheat the combustion air for the cement kiln in white cement manufacture. The gases from such a combustor can either be used directly to provide combustion air, or preferably, indirectly, to heat combustion air via a heat exchanger.

According to this aspect the present invention provides a method of heating a kiln which comprises burning a first supply of fuel with air in a combustor, transferring the heat of combustion thereof to a gas containing oxygen, feeding the thus heated gas containing oxygen to the kiln, and burning a second supply of fuel in the kiln with said heated gas.

In a preferred embodiment of the method, the first supply of fuel is of a lower grade than the second supply of fuel, the latter being for instance a high grade fuel required to attain a specified kiln temperature.

The heat of combustion of the first supply of fuel may be transferred to the gas containing oxygen, for supporting combustion of the second supply of fuel in the kiln, in various ways. For example an amount of air may be supplied for temperature control purposes to the combustor in excess of that required for combustion of the first supply of fuel and subsequently conducted to the kiln directly or by way of a decontamination stage for removal of constituents deleterious to the process in the kiln. In an alternative example the heated gas containing oxygen is obtained by passing air through a heat exchanger heated by the optionally decontaminated combustion products from the combustor, before or after using said air to moderate the combustor temperature.

The invention will now be further described by way of illustration with reference to the accompanying drawings, in which.

Figure 1:
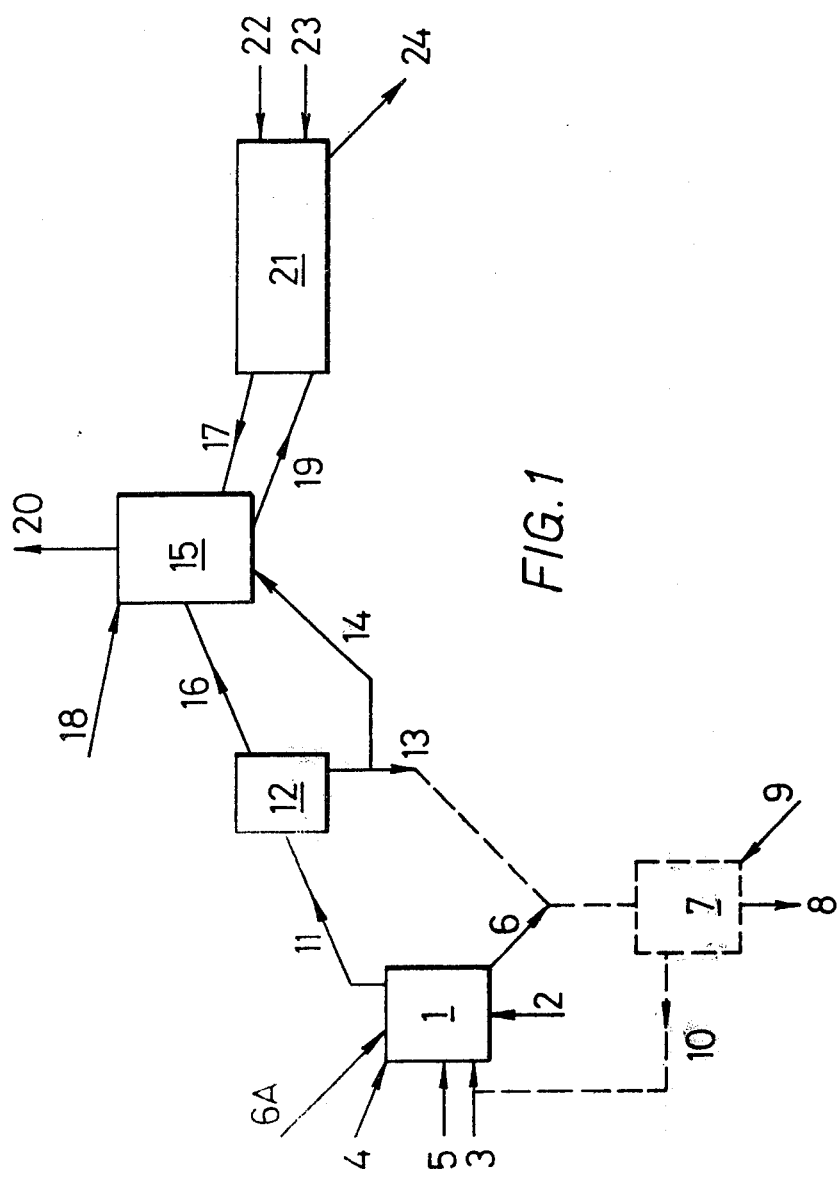
FIG. 1 is a schematic flow diagram of an arrangement of a combustor, slurry drier, calciner and cooler suited to the application of the invention to wet process cement clinker production.

Referring to FIG. 1, a combustor 1 is supplied with combustion/fluidising air 2, through the usual distributor plate in the case of a fluidised bed with the possibility of supplying part of the combustion air directly into the bed 3. Solid fuel 4 is supplied to the combustor and also waste or low grade liquid fuel 5 may be supplied. The bed solids are removed as required at 6. It may be required to take advantage of the pozzolanic properties of the bed solids by intergrinding or blending them with Portland cement. If the carbon content of the bed solids is high, it may be necessary to pass them through a final combustor 7, from which they emerge at 8 with a suitably reduced carbon content. In this case it may be preferred, in order to recuperate the sensible and combustion heat from the main combustor bed solids, to direct the combustion/cooling air 9 to the final combustor 7 via a duct 10, to the main combustor bed. Depending on the calorific value, ash and moisture contents of the solid and/or liquid fuels fed to the main combustor bed, and the total quantity of combustion air, it may be necessary to introduce water or slurry or dry cement raw material via 6A to the main combustor bed 1, in order to keep the combustor bed temperature below the melting or stickiness temperature of the ash. Alternatively this temperature may be controlled by using at 2 or 3, combustion air in excess of that required to completely burn the fuel, 4 or 5, or by recycling part of the drier exhaust gas 20; the latter possibility would be preferable on grounds of overall fuel consumption of the process and minimisation of the quantity of final effluent gas from the process to be dedusted. The hot, dust-laden combustion gases 11 from the main combustor bed may need, depending on the nature of the waste solid fuel and the magnitude of the dust burden which is consequently contained in the hot combustion gases 11, to be passed through a cyclone or similar dust collector 12, the collected dust then being divided in a controlled manner, so that part of this collected dust 13 is removed from the system, with the option of passing it first through the final combustor 7 and a controlled part of this dust 14 is fed to the drier 15. The hot combustion gas from the main combustor bed, which may have been partially dedusted by a deduster 12, is passed via 16 to the drier 15. This drier is fed also with hot exhaust gas 17 from the calciner/cooler unit(s) 21. The slurry raw material feed 18 to the process is fed to the drier, the drier exhaust gas 20 is removed by means of a suitable fan through a dust collector, and the dried solids are removed via 19 to the calciner/cooler unit(s). It will be noted that the dried solids from the drier comprise a mixture of solids originating from the slurry feed and dust arising from the main combustor. This drier is preferably one which will intimately mix the solids from the slurry and the dust from the main combustor bed, e.g., a flash drier or a spray drier. The fuel 22 to the calciner/cooler unit(s) 21 is accompanied by combustion air 23, this quantity of combustion air being sufficient to completely burn the fuel 22 and any unburned carbon in the ash dust from the main combustor 12, which has been incorporated into the solid feed to the calciner/cooler unit(s) via routes 16 and 14. The calcined material product from the process finally emerges at 24.

The type of process outlined in the preceding paragraph can give rise to fuel savings as illustrated in the following example. A conventional wet process cement kiln when fed with a slurry of 40 percent moisture content (wet basis) will require a kiln fuel consumption of about 1550 kcal per kg cement clinker product, this fuel being a conventional good quality coal or heavy fuel oil. If converted to the combined combustor/calciner-cooler process illustrated in FIG. 1 the consumption of conventional good quality coal or heavy fuel oil will be only about 1000 kcal per kg cement clinker product. The combustor will require an additional heat input of about 400 kcal per kg cement clinker product, but this heat input can be provided from very low quality solid and liquid fuels which are normally regarded as waste materials and which therefore have a price which is negligible in comparison with conventional good quality coal or heavy fuel oil. It will be noted that the total heat consumption, including both conventional kiln fuel and low quality solid and liquid fuels, of the process outlined in FIG. 1 is reduced to about 1400 kcal per kg clinker product compared with about 1550 kcal per kg product for the conventional wet process, this overall reduction of total thermal energy input being the combined result of the lower slurry moisture content because of its lower content of argillaceous constituent, the additional reduction of moisture input to the sytem resulting from the substitution of slurried argillaceous component by dry ash dust from the combustor, and the greater evaporative efficiency of the flash or spray drier compared with the usual chain heat exchanger slurry drying system in the conventional wet process kiln.

Figure 2:
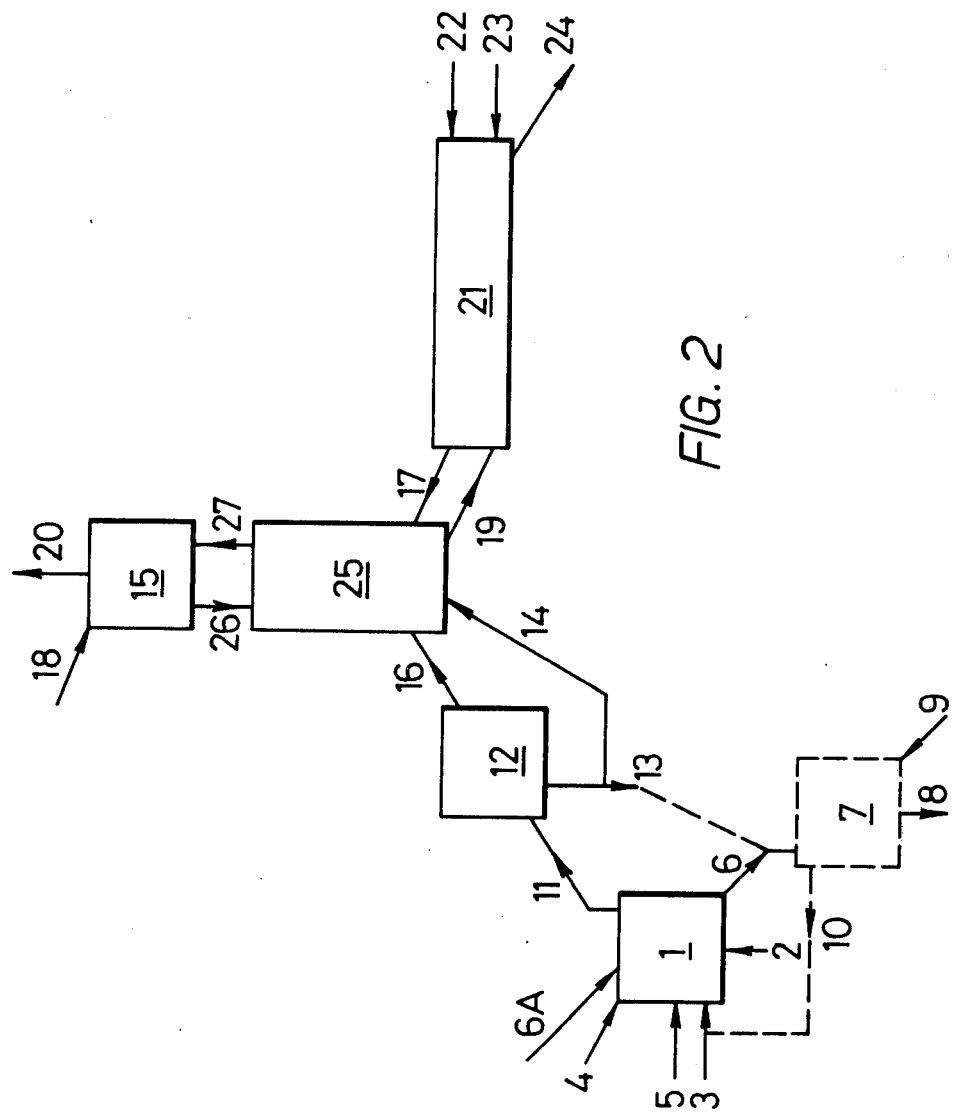
FIG. 2 is a schematic flow diagram of an arrangement alternative to that of FIG. 1, employing an additional heat exchanger.

A further adaptation of the methods and principles of the invention is illustrated in FIG. 2. It will be noted with reference to FIG. 2 that the main process items, the combustor 1, the optional final combustor 7, the cyclone or similar deduster 12, the drier 15 and the calciner/cooler unit(s) 21, are as in FIG. 1 and the input and output streams, 2, 3, 4, 5, 6, 7, 8, 10, 11, 13, 14, 16, 17, 18, 19, 20, 22, 23 and 24 to and from the combustors and the calciner/cooler unit(s) are as in FIG. 1. The additional unit 25 is a separate preheating-calcination unit comprising a suitable array of cyclonic or fluidised bed or other suitable heat exchangers, the function of which is to accept the exhaust gas 17, from the calciner/cooler unit(s) together with the hot exhaust gases from the combustor 1 which may be partially dedusted by the collector 12 and to use the incoming heat from these two hot gas sources to preheat the solid feed material before it enters the calciner unit(s) 21, and also to effect a partial or complete progression of any endothermic reactions (e.g., in the case of cement clinker production, decarbonation) where those endothermic reactions will take place at temperatures less than the maximum permissible exhaust gas temperature of the combustor. In cases where the feed material to the process is in the form of a slurry, that slurry is dried in a drier 15, using the exhaust gas 27 from the separate preheating calcination unit 25 prior to being fed as a dry, powdered feed to the separate preheating-calcination unit 25. Where the feed material to the process is in the form of a dry powder, the drier 15 would of course be omitted and the dry powder feed will be admitted directly to the separate preheating-calcination unit; in this case it will be advantageous to make use, where possible, of the exhaust gas from the separate preheating-calcination unit to effect any necessary drying of the quarried raw materials during the grinding-drying of those quarried raw materials. The thermodynamic advantage of this system as outlined in FIG. 2 as compared with the system outlined in FIG. 1, is that it enables full advantage to be taken of the high temperature, high grade heat content of the combustor exhaust gases to effect at least partial progression of any endothermic reactions which may be progressed at that temperature, and this results in further economies in the overall thermal input.

Figure 3:
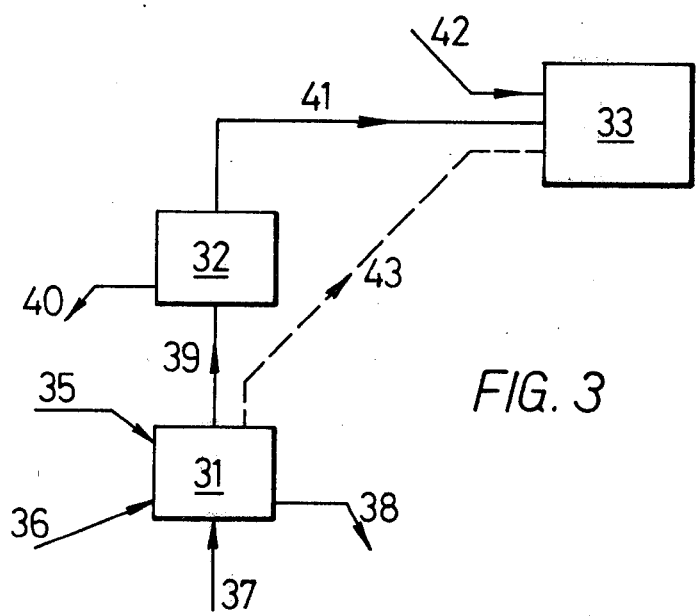
FIG. 3 is a schematic flow diagram of an arrangement according to the invention in which air for combustion in a kiln is obtained directly from an external combustor.

Referring to FIG. 3, a first supply of relatively cheap fuel 35 is burnt in a combustor 31. Sufficient air is supplied at 36 to burn the fuel. In addition further air is supplied, 37, if necessary, to prevent the temperature exceeding that required to fuse any ash present. Any ash produced is removed at 38.

Hot gases so produced either pass direct to a calcination kiln 33 via 43 or to a decontamination process 32, for example a cyclone to remove ash, via 39 and then via 41 to the kiln. A second supply of high grade fuel 42 is fed to the kiln to increase the gas temperature to that required for the calcination process.

It is a necessary condition that hot gases at 41 or 43 passing to the kiln 33, shall contain free oxygen to burn fuel 42.

Figure 4:
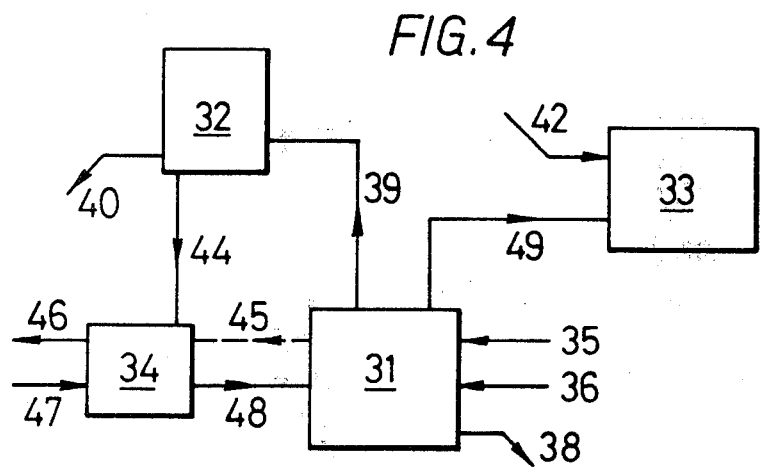
FIG. 4 is a schematic flow diagram of an arrangement alternative to that of FIG. 3 in which air for combustion in a kiln is obtained indirectly from a combustor by way of a heat exchanger.

Referring to FIG. 4, a first supply of relatively cheap fuel 35 is again fed to a combustor 31, but in this case just sufficient air 36 is supplied to burn the fuel 35. Combustion waste gases from the combustor then pass to heat exchanger 34 either directly, via 45, or indirectly via 39 and 44 through a decontaminating stage 32 used, for example, for further dust removal. These combustion gases are subsequently exhausted, 46, and take no further part in the process.

Cold air 47, to be used in the combustion of a second supply of high grade kiln fuel, 42, is preheated using heat from the combustion gases, transferred in heat exchanger 34. This air then passes to the combustor 31, via 48, and is used to cool the combustor, so that if necessary ash fusion temperatures are not exceeded. The hot air then passes via 49 to the kiln 33 and is used to burn high grade fuel, 42. An alternative arrangement is to pass the cold air, 47, first to the combustor 31, then to heat exchanger 34 and then to the kiln 33.

The total heat consumption required for the indirect process may be less than that required for the direct process, because the total quantity of gas to be heated to about 2000° C. is less. Indeed such an indirect process may even require a lower total heat consumption than a process where all the fuel is fed to the kiln, for the same reasons.

An additional stage may advantageously be added, particularly when the feed to the kiln is in slurry form; the exhaust hot combustion gas 46, may be suitably dedusted and then used to evaporate moisture from the slurry feed to the kiln in a separate drier.

It will be recognised that further refinements and additions may easily be made to the above described processes, as follows: where there is, by virtue of the thermal demands of the process as compared with the thermal inputs possible with the solid or liquid low grade fuels, an excess of heat available in the combustors, water tubes may be installed in the combustors to effect the necessary heat abstraction and to raise steam for power generation or for other uses.

Moreover whereas the combustors in the systems described in FIGS. 3 and 4 are envisaged to be operating at about atmospheric pressure, if a fluid bed combustor is installed it may be designed to operate at substantially higher pressures than atmospheric. In that case a power turbine may be inserted in the hot exhaust gas from the fluid bed combustor so as to generate mechanical energy for electricity generation or for other, direct, uses.

What is claimed is:

1. In a method of thermal calcination of minerals which comprises the steps of introducing mineral matter into a calcination system comprising an optimal pretreatment zone and a kiln, introducing combustion air and high grade fuel directly into said kiln in such quantities as to effect calcination of said mineral matter, and recovering the calcined mineral matter from the kiln, the high grade fuel having an ash content which does not exceed a predetermined value and a calorific value sufficient to produce a temperature in excess of 900° C. in said kiln, the improvement which comprises:

burning combustible matter externally of said kiln and obtaining at least one heated gaseous medium which is at a temperature not greater than about 900° C., and transferring heat from said heated gaseous medium to said calcination system whereby the quantity of said high grade fuel may be reduced, said combustible matter having an ash content significantly higher and a calorific value significantly lower than said high grade fuel.

2. A method according to claim 1, wherein the calcination system is a Portland cement clinker production system.

3. A method according to claim 1, wherein said combustible matter is a low grade fuel comprising colliery discards, colliery minestone, domestic refuse, industrial refuse or waste oil.

4. A method according to claim 2, wherein said transferred heat is employed in endothermic treatment of wet process cement kiln feed.

5. A method according to claim 4, wherein said feed is directly contacted with the gaseous combustion products of said combustible matter.

6. A method according to claim 2, wherein said transferred heat is employed in the atmosphere of the kiln.

7. A method according to claim 6, wherein the calcination system is a white cement clinker production system.

8. A method according to claim 6, wherein the gaseous combustion products of said combustible matter, with air, are supplied directly to the kiln.

9. A method according to claim 6, wherein the gaseous combustion products of said combustible matter are heat exchanged with a gaseous medium comprising air which is supplied to the kiln.

10. The method of making Portland cement clinker which comprises the steps of:
(a) providing a Portland cement raw feed mix which is poor in argillaceous material;
(b) burning combustible matter which has a high ash content and a low calorific value and recovering the heated products of combustion thereof together with entrained ash;
(c) homogeneously contacting at least some of the ash recovered in step (b) with the raw feed mix of step (a) to provide a feed mix having a correct amount of argillaceous material while simultaneously heating said feed mix by means of heat obtained from said recovered products of combustion of step (a);
(d) introducing the heated feed mix from step (c) into a cement kiln; and (e) firing said kiln with a high grade fuel having a calorific content significantly greater than that of said combustible matter.

11. The method of claim 10 wherein said heated products of combustion with entrained ash are treated to remove at least some of said ash therefrom and are thereafter directly contacted with the raw feed mix in step (c).

12. The method of claim 10 wherein said products of combustion with entrained ash are treated to remove at least some of the ash therefrom, and including the steps indirectly heating air from the treated products of combustion and directing said heated air and at least some of the removed ash into contact with said raw feed mix in step (c).

13. The method of claim 10 wherein said raw feed mix is a slurry and step (c) effects drying of said slurry as well as enriching the argillaceous content thereof.

14. The method of claim 11 wherein said raw feed mix is a slurry and step (c) effects drying of said slurry as well as enriching the argillaceous content thereof.

15. The method of claim 12 wherein said raw feed mix is a slurry and step (c) effects drying of said slurry as well as enriching the argillaceous content thereof.

* * * * *